Aug. 29, 1961 L. E. SODERQUIST 2,997,738
APPARATUS AND METHOD FOR POSITIONING A TIRE IN A CURING PRESS
Filed Feb. 18, 1959 4 Sheets-Sheet 1

INVENTOR.
LESLIE E. SODERQUIST
BY
ATTORNEYS.

Aug. 29, 1961 L. E. SODERQUIST 2,997,738
APPARATUS AND METHOD FOR POSITIONING A TIRE IN A CURING PRESS
Filed Feb. 18, 1959 4 Sheets-Sheet 2
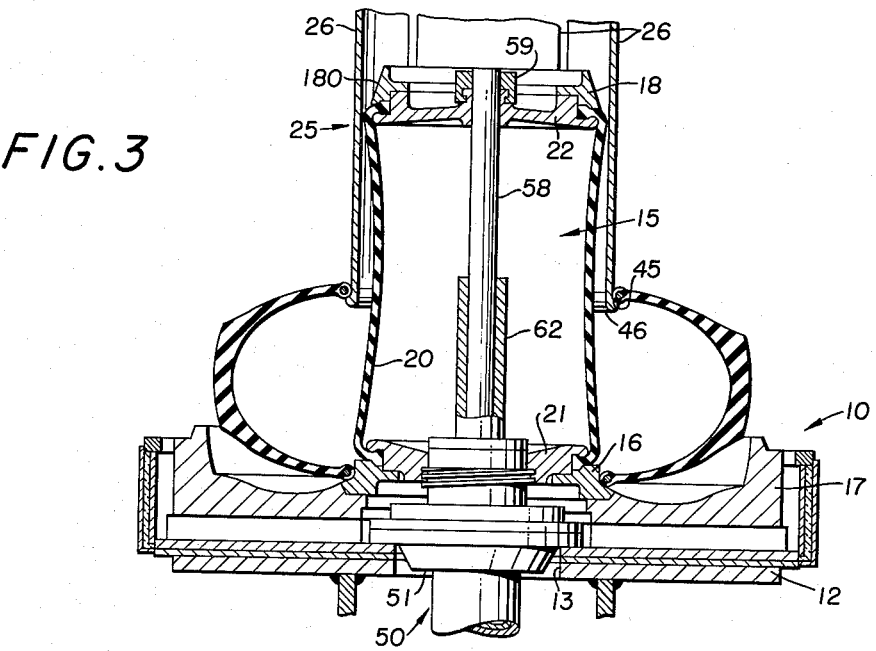
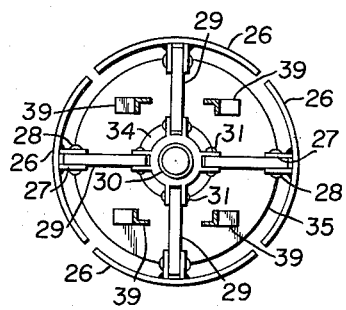
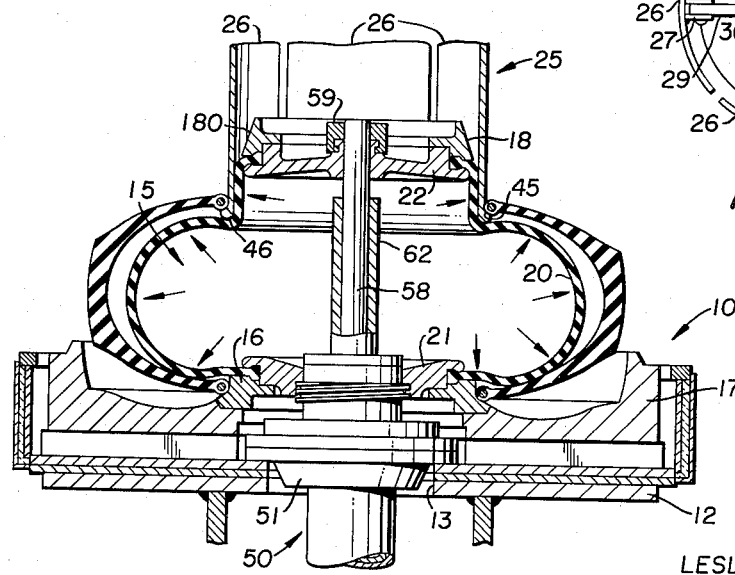
INVENTOR.
LESLIE E. SODERQUIST
BY
ATTORNEYS Aug. 29, 1961   L. E. SODERQUIST   2,997,738
APPARATUS AND METHOD FOR POSITIONING A TIRE IN A CURING PRESS
Filed Feb. 18, 1959   4 Sheets-Sheet 3

INVENTOR.
LESLIE E. SODERQUIST
ATTORNEYS.

INVENTOR.
LESLIE E. SODERQUIST

ATTORNEYS.

United States Patent Office 2,997,738
Patented Aug. 29, 1961

2,997,738
APPARATUS AND METHOD FOR POSITIONING A TIRE IN A CURING PRESS
Leslie E. Soderquist, Silver Lake, Ohio, assignor to The McNeil Machine & Engineering Company, Akron, Ohio, a corporation of Ohio
Filed Feb. 18, 1959, Ser. No. 794,185
7 Claims. (Cl. 18—2)

The present invention relates to improvements in presses wherein unvulcanized tire bands are fully shaped into tire form and cured without removal from the press. More particularly, the invention relates to improvements in the loading and positioning of an uncured tire band in a press and for shaping the tire band prior to curing. The invention specifically relates to a tire press of the permanent diaphragm type and to a novel concept of loading and positioning in such a press an uncured tire band which, for reasons of tire construction, has been at least partially shaped prior to delivery to the press for final shaping and curing.

Recent developments in the art of tire building require that presses be adapted to receive and shape uncured or green tire bands which have been at least partially shaped in toroidal form during the building operation. For example, large truck tires are being built with several plies of rubber coated woven or braided, wire or metallic reinforcements. Such wire reinforced tire bands are not as readily formable as tire bands using rayon, nylon or cotton fabric plies and so it has been suggested that preforming the wire reinforced tire band before delivery to the press will facilitate the final shaping and curing operation.

However, preforming or preshaping has created certain problems in the operation of loading a press. Preformed tire bands are usually very large and heavy and so manual loading has severe limitations and drawbacks. Also, in presses utilizing "bag" or diaphragm-type shaping mechanisms, such as for example the type shown in applicant's U.S. Patents No. 2,495,663 or 2,699,572, the radial expansion of the bag at the beginning of the shaping operation will cause the bag to frictionally engage, and undesirably rub against, the inside surfaces of the beads of the uncured band.

It is therefore an object of the invention to improve the operation of a press being used for the final shaping and curing of at least partially shaped or preformed uncured tire bands.

It is a further object to provide an improved concept of press operation whereby a press may be mechanically loaded with a preshaped tire band of any size and the shaping mechanism positioned within the band ready for final shaping and curing, without damage to either the uncured band or the shaping mechanism.

Specifically, it is an object to provide improved mechanism for loading a preshaped tire band into a press having a diaphragm-type shaping mechanism and for cooperating with the shaping mechanism during expansion for final shaping and curing.

These and other objects of the invention, as well as the advantages thereof, will be apparent in view of the following detailed description when taken in conjunction with the attached drawings.

In the drawings:

FIG. 2 is a plan section looking down on the improved loading mechanism, taken substantially as indicated on line 2—2 of FIG. 1;

FIG. 3 is a sectional view showing a partially shaped tire band as positioned by loading mechanism in the lower mold half;

FIG. 4 is a similar view, in sequence after FIG. 3, showing the cooperative relation between the shaping mechanism and the loading mechanism;

Figure 1:
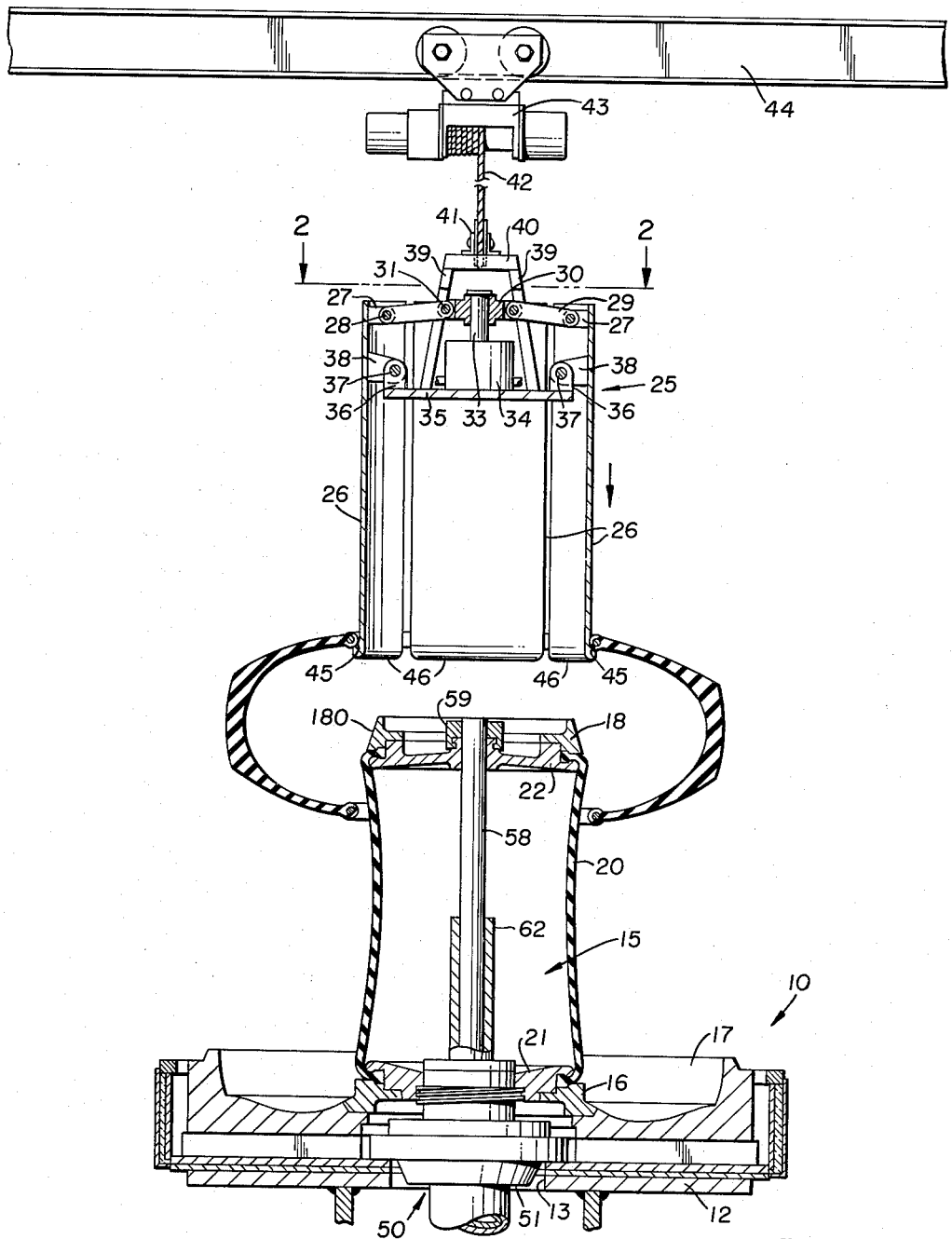
FIG. 1 is an elevation, partly in section, showing the lower mold half of a press in open position, a typical diaphragm-type shaping mechanism, and the improved mechanism for loading a partially shaped uncured tire band.

The invention provides a novel loading mechanism in the form of an expandable chuck: having a plurality of segments which are increased in diameter to engage a bead of and to pick up a partially shaped or preformed uncured tire from a storage area or delivery means; to axially move the uncured tire to a predetermined position in relation to a radially movable forming mechanism; to remain in the predetermined position while the forming mechanism is moved into shaping position within the uncured tire; and to disengage from the tire bead and withdraw only after the shaping mechanism is in a satisfactory position within the uncured tire. Additionally, the invention contemplates an improved press operation in cooperation with the loading chuck whereby the shaping mechanism is positively maintained in a predetermined position until the chuck is completely withdrawn and the final closing movement of the press is ready to begin.

A tire press suitable for practice of the invention has a separable lower mold half 10 and upper mold half 11 and an axially centered forming mechanism or diaphragm-type shaping mechanism. Presses of this type aret well known to this art and reference is made to the inventor's prior United States Patent No. 2,808,618 for such details as are required to more fully understand the invention. The construction and operating mechanism of presses according to Patent No. 2,808,618 is such that it is possible to obtain a maximum "tilt-back" of the upper mold half 11 and clearance above the lower mold half 10 without loss of valuable head room above the press. This type of press is preferred, but it will be apparent that presses of other types and designs could be used in practice of the invention so long as there is at least limited clearance above the lower mold section when the press is open.

Referring to the drawings, the lower mold half 10 is mounted on the press bed plate 12. The bed plate has a central bore 13 through which extends the operating cylinder for a diaphragm-type shaping mechanism indicated generally by the numeral 15.

The shaping mechanism 15 includes a movable annular bead ring 16 which seats in the lower mold section 17. The molding surfaces of the ring 16 and mold section 17 define the lower portion of a cured tire. The upper portion of a cured tire is defined by the molding surfaces of a movable annular bead ring 18 and upper mold section 19. The bag 20 of the shaping mechanism is an elongate, deformable, heavy walled, preferably rubber, cylinder, clamped at the lower end between a plate ring 21 and bead ring 16 and at the upper end between another plate ring 22 and bead ring 18.

The loading chuck 25 has a plurality of, at least two and preferably four, transversely curved segments 26 contacting an uncured tire at spaced apart areas (see FIG. 1) and defining a cylinder having an expanded diameter greater than the maximum diameter of the bag 20 when elongated. Each segment has a clevis flange 27 on its inner surface. As best shown in FIG. 2, each flange 27 has a pivot pin 28 engaging the outer end of a rigid link bar 29. The inner end of each bar 29 is received within a similar flange on an actuating ring 30 and engaged by another pivot pin 31.

Referring to FIG. 1, the actuating ring 30 is located axially of the chuck approximately equidistant from each segment 26. The ring has a central bore receiving the upwardly extending piston rod 33 of a short-stroke conventional pneumatic cylinder 34 for controlling the diameter of the chuck segments 26. The cylinder 34, suitably connected to a fluid pressure source (not shown), is mounted on a circular plate 35. The mounting plate 35 is suspended within the chuck by ear flanges 36 engaged by pivot pins 37 carried by horizontal flanges 38 on the inner surface of the segments 26, medially of the chuck segment and below flange 27. When the piston rod 33 is retracted, the extensible interconnecting linkage defined by the actuating ring 30, the link bars 29, the pivot pins 30 and 28 and the flanges 27 will be straightened to expand the chuck segments 26 about the pivot pins 37 to their maximum diameter.

Extending upwardly from the mounting plate 35 are angle straps 39 connected at their upper ends by a pulley plate 40. A pulley 41, or other suitable fastener, mounted atop plate 40 is coupled to the cable 42 of a conventional hoist 43. The hoist 43 moves along a structural beam 44 which is located in any desired manner, but preferably so as to serve as a battery of presses, and raises or lowers the chuck 25 as required.

The lower end of each chuck segment 26 has a bead edge 45 extending radially outwardly of the longitudinal axis of the chuck and specifically contoured to engage the inner surface of and to fit beneath the upper bead of an uncured tire without injury thereto. On the inner face of each segment, opposite of the bead edge 45, is another surface 46 which is also specifically contoured. As shown in FIG. 4, the inner surface 46 which projects inside of the tire past the upper bead is smoothly curved to provide a minimum of frictional resistance and to serve as a guide as the diaphragm bag 20 is radially expanded to shaping position within the uncured tire.

Figure 5:
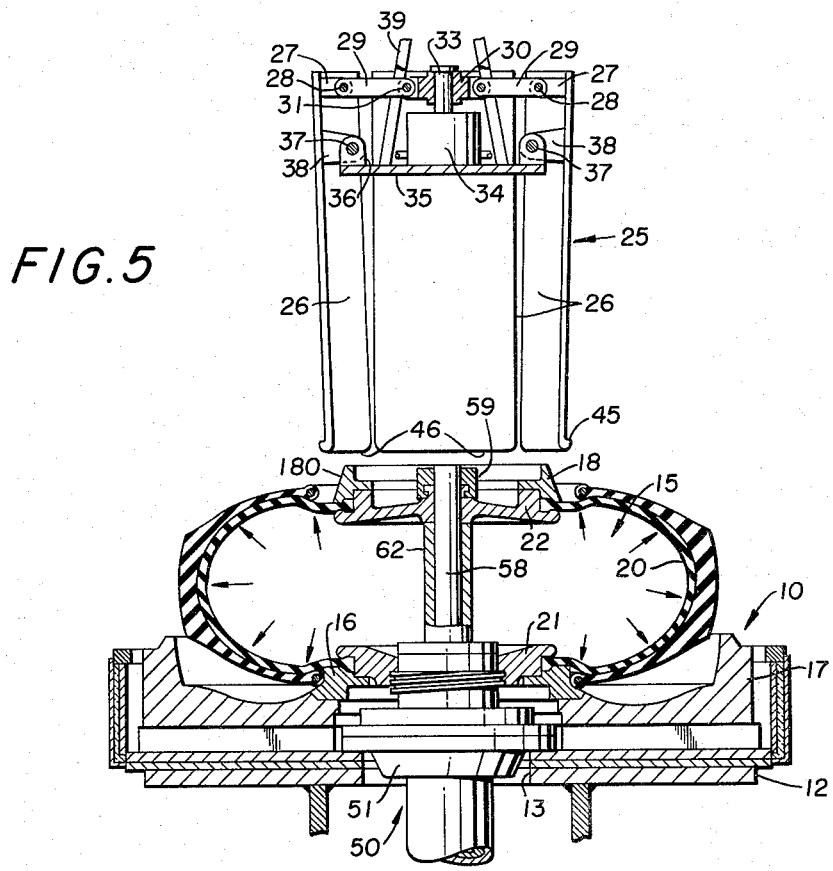
FIG. 5 is a further sequential view showing withdrawal of the loading mechanism.

To facilitate withdrawal of the chuck 25 as shown in FIG. 5, the upper bead ring 18 is preferably tapered as indicated at 18a, at an angle of for example about 15°, which angle is slightly greater than the angle of about 10° normally employed for upper bead ring of conventional diaphragm-type shaping mechanisms.

Figure 7:
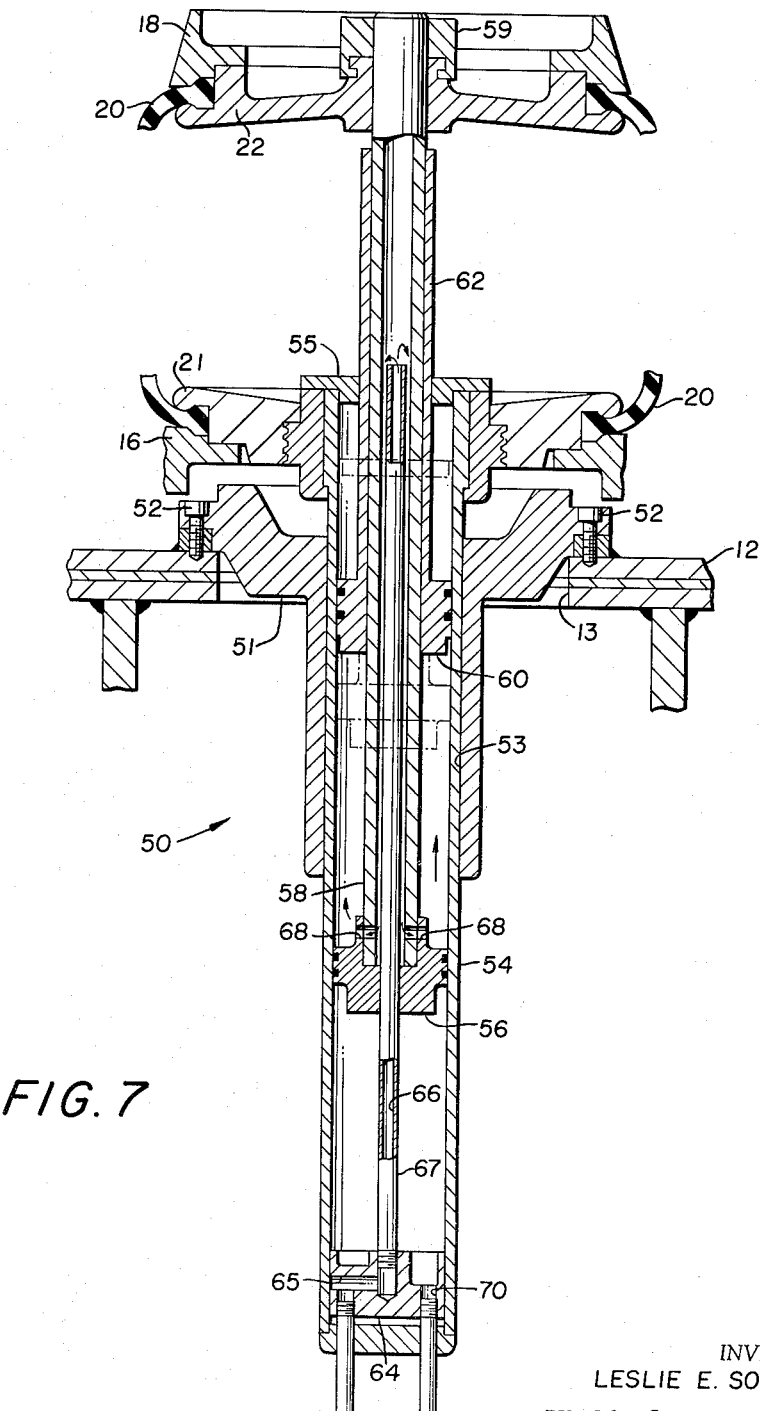
FIG. 7 is a partially schematic vertical section of the the operating cylinder for the diaphragm-type shaping mechanism.

The upper bead ring 18-plate ring 22 assembly is moved relative to the lower bead ring 16-plate ring 21 assembly, to selectively permit the bag 20 to radially expand during the shaping operation sequence and to be elongated after the curing operation, by a cylinder mechanism 50. As best shown in FIG. 7, a bell-shaped housing 51 is fitted in the central bore 13 of the press bed plate and secured by bolts 52. The housing 51 is hollow and has a downwardly extending stem defining a bore 53 for slidably receiving a cylinder casing 54. The upper end of casing 54 carries an exteriorly threaded cap member 55 for attachment of the plate ring 21.

Within the cylinder casing 54 are two pistons. The lower piston 56 carries a hollow piston rod 58 which extends through the cap member 55 and carries the upper plate ring 22. The upper bead ring 18 may be secured to the plate ring 22 by a coupling member 59 clamped on the upper end of piston rod 58. The upper piston 60 is seated on the exterior of piston rod 58 so as to be capable of independent movement. Attached to the upper side of piston 60 is an elongated stacking or positioning sleeve 62 which provides a positive means to maintain the upper bead ring 18-plate ring 22 assembly in a predetermined position while the chuck 25 is being withdrawn.

At the lower end of cylinder casing 54 is a head cap 64 having a pair of inlet bores. An axial inlet bore 65 communicates with the hollow bore 66 of a rod 67 slidably fitted through the lower piston 56 and extending upwardly within the hollow piston rod 58. Above piston 56 and below piston 60, radial passages 68 extend through the wall of piston rod 58. The second inlet bore 70 in the head cap 64 communicates with the interior of the cylinder casing 54 below the lower piston 56.

To raise the stacking sleeve 62 and the upper bead ring 18-plate ring 22 assembly to maximum elevation above the lower mold (the condition of FIG. 1), fluid under pressure may be admitted through inlet bore 70. The lower piston 56 raises, carrying the upper piston 60, until the cap member 55 is contacted. Thus, the stacking sleeve 62 will be at approximately the height of the upper bead of the uncured tire and the bag 20 will be elongated.

As the bag 20 is radially expanded, the upper bead ring 18-plate ring 22 assembly is lowered while maintaining the elevation of the stacking sleeve (the condition of FIG. 4). This is accomplished by fluid admitted through inlet bore 65 which forces the lower piston 56 downward a predetermined distance, maintaining the upper piston 60 in contact with the cap member 55.

When the upper bead ring 18-plate ring 22 assembly is in the position of FIG. 5, the pressure between the upper piston 60 and lower piston 56 is equalized and the movement stops, the bag 20 is fully shaped and positioned within the uncured tire and the chuck 25 may be withdrawn.

To strip the cured tire from the lower mold 10 after curing, both bead ring-plate ring assemblies are raised together, in a conventional manner, by an actuating means (not shown) connected to the lower end of the cylinder casing 54 which is raised upwardly within the bore 53 of the bell-shaped housing 51.

*Operation*

In FIG. 1, the segments 26 of the chuck are expanded by extension of the piston rod 33 of the cylinder 34 and the segment bead edges 45 are engaged with the upper bead of an uncured tire band which has been brought from a storage area or delivery means. The upper bead ring 18-plate ring 22 assembly is at maximum elevation by upward extension of the piston rod 58. The stacking sleeve 62 is at maximum elevation by upward movement of the upper piston 60. The lower bead ring 16-plate ring 21 assembly is seated in the lower mold 17 by lowering of the cylinder casing 54.

In FIG. 3, the segments 26 remain expanded while the chuck 25 and uncured tire are lowered by the hoist 43 over the elongated bag 20 until the uncured tire rests on the lower bead ring 16.

In FIG. 4, the segments 26 are still in the expanded position. The upper bead ring 18-plate ring 22 is being lowered by controlled release of the fluid pressure through inlet bore 70. The stacking sleeve 62 remains at maximum elevation. Fluid under pressure is being introduced into the bag 20 in a conventional manner (not shown), to provide for radial expansion as indicated by the arrows. It will be noted that the clearance between the upper bead of the uncured tire and the bag 20, afforded by the segment edges 45, permits air entrapped between the expanding bag and the uncured tire to escape through the apertures of the expanded chuck segments 26.

It is only after the bag 20 has been fully expanded that the segments 26 are retracted and the chuck 25 is withdrawn. In FIG. 5, the chuck segments 26 have been moved arcuately inwardly by retraction of the piston rod 33 of cylinder 34 and the segment bead edges 45 are disengaged from the upper bead of the uncured tire band. The upper bead ring 18-plate ring 22 assembly has continued to lower until arrested, and positively maintained in a position approximately level with the upper bead of the uncured tire, by the still extended stacking sleeve 62. The positive positioning afforded by sleeve 62 is maintained while the chuck 25 is withdrawn and until the upper mold half 11 contacts the uncured tire. This action ensures that the uncured tire will be uniformly deformed to toroidal shape without irregular expansion or distortion of the bag 20.

Figure 6:
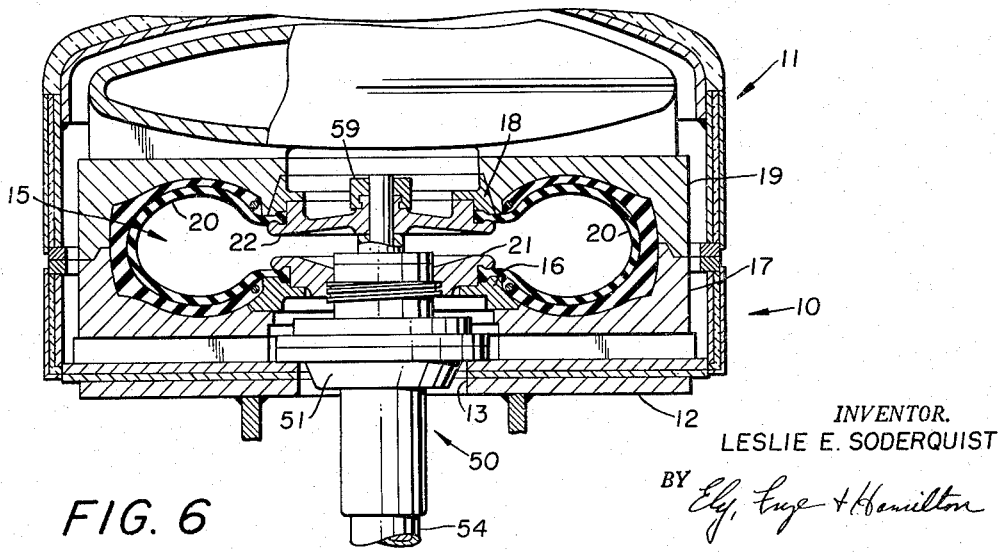
FIG. 6 is a sectional view showing the press mold halves in closed position for the curing operation.

In FIG. 6, the press is closed and the tire is finally shaped and cured. This last operation is conventional with the curing fluid being admitted into the mold interior in any suitable manner; reference being made to U.S. Patent No. 2,775,789 for further description of suitable mechanism for introducing curing fluid.

The above description and accompanying drawings, and the references to prior patents in the same art, are considered sufficient to enable one skilled in the art to understand the principles and workings of the invention. However, it will be appreciated that exact details are not essential and the concept of the invention may be varied or modified within the scope of the advance in the art and the appended claims.

What is claimed is:

1. Apparatus for positioning a partially shaped tire in a press having separable mold halves and radially movable forming means located axially of one of said mold halves, comprising a cylindrical chuck having a plurality of expandable segments, said segments being adapted when expanded to engage an inner surface of a bead of a partially shaped tire, means to expand said segments, means to axially move said chuck and a partially shaped tire engaged by the segments thereof until said tire contacts one of said mold halves and means to radially move said forming means within said tire while said segments remain engaged with the tire.

2. Apparatus for positioning a partially shaped tire in a press having separable mold halves and a diaphragm-type shaping mechanism, comprising a cylindrical chuck having a plurality of expandable segments, said segments being adapted when expanded to engage the inner surface of the upper bead of a partially shaped tire, means to expand said segments, means to lower said chuck and a partially shaped tire engaged by the segments thereof over said shaping mechanism until the lower bead of said tire contacts one of said mold halves, and means to radially expand said shaping mechanism within said tire while said segments remain engaged with the tire.

3. An expansible chuck for loading a partially shaped tire over a diaphragm-type shaping mechanism in a curing press, comprising, a plurality of segments defining a cylinder having an expanded diameter greater than the diameter of said shaping mechanism and means for decreasing the diameter of said chuck at one end thereof, the segments at said chuck end each having an outwardly directed edge adapted to engage the inner surface of a bead of an uncured tire and a smoothly curved inner surface opposite of said edge adapted to provide a minimum of frictional resistance and to serve as a guide when said shaping mechanism moves within said tire.

4. An expansible chuck for loading a partially shaped tire over a shaping mechanism having a radially expandible diaphragm in a curing press, comprising, a plurality of segments defining a cylinder having an expanded diameter greater than the diameter of said diaphragm when elongated and means for decreasing the diameter of said chuck segments at one end thereof, the segments at said one end of said chuck each having an outwardly directed edge adapted to engage the inner surface of a bead of an uncured tire when said chuck is expanded and to disengage said bead when the chuck diameter is decreased and a smoothly curved inner surface opposite of said edge adapted to provide a minimum of frictional resistance and to serve as a guide when said diaphragm is radially expanded to shaping position within said tire.

5. Apparatus for use with a press having separable mold halves and a diaphragm mechanism for shaping and curing tires, said diaphragm mechanism including an elongate radially deformable bag attached between upper and lower plates, comprising, expandable means located axially of said diaphragm mechanism and adapted when expanded to engage the inner surface of a bead of an uncured tire, means to move said expandable means axially of said diaphragm mechanism until said uncured tire contacts one of said mold halves, means to move said upper and lower plates together and to radially deform said bag while said expandable means remains engaged with said bead of the tire, and additional means to maintain the position of said upper plate when said bag is fully deformed and while said expansible means is disengaged from said tire and axially withdrawn.

6. A method for positioning a partially shaped uncured tire in a press having a permanent diaphragm shaping mechanism located axially of a press mold half, said diaphragm being initially cylindrical in form, comprising the steps of:

engaging the inner surface of the upper bead of said tire at spaced apart areas;

positioning said tire in telescoped relation over said diaphragm with the lower bead of the tire adjacent the lower end of the diaphragm, with the lower body portion of the diaphragm spanning the open space between the tire beads and with the upper body portion of the diaphragm projecting upward and beyond the tire for a substantial distance;

applying fluid pressure within said diaphragm and temporarily supporting said projecting upper body portion of the diaphragm against the forces of said fluid pressure and guiding the upper body portion around the upper bead while causing the upper end of said diaphragm to move toward the tire and progressively inflating the diaphragm between the tire beads into said tire; and disengaging said upper bead of the tire when the upper end of said diaphragm has moved adjacent the upper bead.

7. A method for positioning a partially shaped uncured tire in a press having a permanent diaphragm shaping mechanism located axially of a press mold half, said diaphragm being initially cylindrical in form, comprising the steps of:

engaging the inner surface of the upper bead of said tire at spaced apart areas;

positioning said tire in telescoped relation over said diaphragm with the lower bead of the tire adjacent the lower end of the diaphragm, with the lower body portion of the diaphragm spanning the open space between the tire beads and with the upper body portion of the diaphragm projecting upward and beyond the tire for a substantial distance;

applying fluid pressure within said diaphragm and temporarily supporting said projecting upper body portion of the diaphragm against the forces of said fluid pressure and guiding the upper body portion around the upper bead while causing the upper end of said diaphragm to move toward the tire and progressively inflating the diaphragm between the tire beads into said tire; and disengaging said upper bead of the tire when the diaphragm is fully inflated.

References Cited in the file of this patent

UNITED STATES PATENTS

| | | |
|---|---|---|
| 1,317,500 | Holmquist | Sept. 30, 1919 |
| 2,065,943 | Lerch et al. | Dec. 29, 1936 |
| 2,826,445 | Tidland | Mar. 11, 1958 |
| 2,848,740 | Frohlick et al. | Aug. 26, 1958 |
| 2,874,405 | Stanford | Feb. 24, 1959 |
| 2,879,101 | Daroci | Mar. 24, 1959 |

UNITED STATES PATENT OFFICE
CERTIFICATE OF CORRECTION

Patent No. 2,997,738                      August 29, 1961

Leslie E. Soderquist

It is hereby certified that error appears in the above numbered patent requiring correction and that the said Letters Patent should read as corrected below.

Column 2, line 35, for "aret" read -- are --; column 3, line 14, for "flange" read -- flanges --; line 26, strike out "as", second occurrence.

Signed and sealed this 20th day of March 1962.

(SEAL)
Attest:

ERNEST W. SWIDER
Attesting Officer

DAVID L. LADD
Commissioner of Patents